US005105069A

United States Patent [19]

Hakenewerth et al.

[11] Patent Number: 5,105,069

[45] Date of Patent: Apr. 14, 1992

[54] SELF-SERVICE TRANSACTION APPARATUS AND METHOD

[75] Inventors: Paul A. Hakenewerth, Charlotte; Gene D. Rohrer, Concord, both of N.C.; Nils G. Stalberg, Lidingo, Sweden

[73] Assignee: International Business Machines Corporation, Armonk, N.Y.

[21] Appl. No.: 335,067

[22] Filed: Apr. 7, 1989

[51] Int. Cl.[5] ........................ G06F 15/30; G06F 7/08; B25J 11/00; E01B 7/00

[52] U.S. Cl. .................................... 235/379; 235/381; 414/225; 901/16; 902/36

[58] Field of Search ............... 235/379, 381, 383, 384, 235/385; 369/34, 35, 36; 364/478, 479; 901/6, 7, 16; 414/225; 902/36, 29

[56] References Cited

U.S. PATENT DOCUMENTS

| | | | |
|---|---|---|---|
| 3,575,301 | 4/1971 | Panissidi | 901/16 |
| 3,606,162 | 9/1971 | Lehmann et al. | 901/7 |
| 3,665,148 | 5/1972 | Yasenchak et al. | 901/7 |
| 3,888,362 | 6/1975 | Fletcher et al. | 901/16 |
| 3,937,925 | 2/1976 | Boothroyd | 235/61.7 B |
| 3,970,992 | 7/1976 | Boothroyd et al. | 340/172.5 |
| 4,132,318 | 1/1979 | Wang et al. | 901/16 |
| 4,305,130 | 12/1981 | Kelley et al. | 901/6 |
| 4,577,284 | 3/1986 | Christy et al. | 364/478 |
| 4,594,043 | 6/1986 | Kawano et al. | 414/225 |
| 4,669,047 | 5/1987 | Chucta | 364/478 |
| 4,692,876 | 9/1987 | Tenna et al. | 901/7 |
| 4,696,426 | 9/1987 | Decker et al. | 232/43.1 |
| 4,714,078 | 8/1988 | Neri | 414/225 |
| 4,752,876 | 6/1988 | Couch et al. | 364/407 |
| 4,754,397 | 6/1988 | Varaiya et al. | 364/900 |
| 4,783,904 | 11/1988 | Kimura | 901/7 |
| 4,789,054 | 12/1988 | Shore et al. | 235/381 |
| 4,814,592 | 3/1989 | Bradt et al. | 235/381 |
| 4,886,412 | 12/1989 | Wooding et al. | 414/225 |
| 4,889,210 | 12/1989 | Alcaraz et al. | 901/7 |
| 4,891,502 | 1/1990 | Motoi et al. | 235/379 |
| 4,988,849 | 1/1991 | Sasaki et al. | 235/379 |

FOREIGN PATENT DOCUMENTS 0191636 8/1986 European Pat. Off. .

OTHER PUBLICATIONS

*IBM 4732 Personal Banking Machine Maintenance Information Manual for Models 001 and 002* (2d ed., Dec. 1988).

*Primary Examiner*—Stuart S. Levy
*Assistant Examiner*—Christopher R. Glembocki

[57] ABSTRACT

Transfer of articles of different types between article handling devices within the apparatus and the user outside of it is effected through a limited number of access ports by an article gripping and transporting robot that undergoes multi-directional translational movement and that is capable of gripping articles of different kinds, sizes and shapes. The robot may be and preferably is also used to perform maintenance services upon article handling devices of the apparatus.

1 Claim, 6 Drawing Sheets

SELF-SERVICE TRANSACTION APPARATUS AND METHOD

FIELD OF THE INVENTION

This invention relates to self-service transaction apparatuses which interact with customers to perform desired transactions, such as those associated with banking, that entail two-way article transfer and communication between the apparatuses and persons using them.

BACKGROUND OF THE INVENTION

Self-service transaction (SST) apparatuses are now widely used to allow persons to perform numerous varied but specific transactions without interfacing with another person. Illustrative are automatic teller apparatuses which automatically perform different banking transactions such as cash withdrawals, transfers, deposits and the like. Other SST apparatuses may perform ticketing services for airlines, railroads or theatrical performances. Still others may automatically perform the transactions customarily attendant rental of an automobile from a car rental company, or a room from a lodging establishment, which transactions customarily would include customer identification, assignment of an automobile or room, distribution and subsequent receipt of keys, and preparation of bills, receipts and the like.

Irrespective of the particular transactions performed by them, most if not all SST apparatuses require and have article transfer means for permitting and/or effecting transfer of articles, which may be of diverse types, to and from persons using the apparatus. For example, an automatic banking apparatus customarily will have a slot-like access port into which a user of the apparatus introduces a banking identification card, and will also have a card conveyor that transports the card to and through a card reading device, and at a subsequent time returns the card back through the aforesaid port to the user of the apparatus. The banking apparatus customarily further includes a second access port into which the user introduces a deposit, and a second conveyor means for conducting the deposit from such port to a repository device, usually via a printer device that places identifying indicia upon the deposit. The typical banking apparatus also has a currency conveyor for conducting paper currency from a currency dispensing device to a third access port of the apparatus. If the apparatus is adapted to also dispense coins, it also may include a separate conveyor for conducting coins from its coin dispenser to either the previously-mentioned currency port or to a fourth access port specifically provided for coins. In any event, the apparatus normally also has still another access port and conveyor by which transaction receipts or other statements are conducted to the user from a statement printer, which normally is separate from and in addition to that employed to identify deposits.

Each access port of an apparatus of the type described must have a security gate or the like associated therewith for preventing unauthorized access to the interior of the housing of the apparatus. Each article conveyor of the apparatus customarily must and does have one or more sensors associated therewith for detecting the presence or absence of the articles to be conveyed thereby. The large number of dedicated conveyors, security gates and sensors complicate the design and significantly increase the direct cost of the typical SST apparatus. Additionally, since each of these components is subject to possible failure, however well constructed, they increase the likelihood that the apparatus will experience malfunctions requiring its removal from operation pending servicing or repair. If restoration of the apparatus to operation is delayed, as for instance due to unavailability of a servicing engineer, the operating cost of the apparatus is increased, and customer dissatisfaction and complaints ensue. Customer dissatisfaction may also be generated by the three or four article access ports customarily upon the apparatus. Many persons who are accustomed to conducting all of their banking transactions through the single opening of a teller cage are so confused by the multiple ports of an SST apparatus that they are unable to successfully use the apparatus.

With the foregoing in mind, an object of the invention is the provision of a banking or similar SST apparatus that is of economical manufacture, can be used without difficulty even by inexperienced persons, is highly reliable in operation, and that can be maintained in or restored to operation with less dependence upon service engineers or technicians.

A related object is the provision of an apparatus of the described type having only a limited number of article access port means, conveyors and associated components.

A more specific object is the provision in an apparatus of the type described of an article gripping and transporting robot that during a single transaction of the apparatus successively conveys articles of different types (i.e., of significantly differing kinds, shapes or sizes) between an access port of the apparatus and any desired one of a plurality of article receiving and/or supplying devices disposed at different locations within the housing of the apparatus.

Another related and still more specific object of the invention is the provision in an apparatus of the type described of an article gripping and transporting robot which, in addition to the foregoing functions, performs maintenance and/or repair services upon other components of the apparatus on either a periodic or "demand" basis.

DESCRIPTION OF THE PRIOR ART

Boothroyd U.S. Pat. Nos. 3,937,925, 3,970,992 and 4,696,426 disclose SST apparatuses for banking transactions. The apparatus of U.S. Pat. No. 3,937,925 includes a plurality of ports for permitting the passage of articles of diverse types into and/or out of the housing of the apparatus, and further includes a plurality of article conveyors for conducting respective ones of the articles between the ports and selected locations within the housing. The apparatus of U.S. Pat. No. 3,970,992 dispenses currency and a receipt through a common port. In the apparatus of U.S. Pat. No. 4,696,426, envelope deposits and individual check deposits are introduced into the apparatus through the same housing port, and are conducted by a bifurcated belt-type conveyor to desired locations within the housing of the apparatus.

Couch et al. U.S. Pat. No. 4,752,876 discloses an SST apparatus for checking guests into and out of a lodging facility, which apparatus includes key dispensing means.

Jones European Patent Application Publication No. 0191636 discloses a vending machine for effecting sales or rentals of video cassettes of equal size and shape. The apparatus includes a cassette transport device that transports the cassettes between a selected one of a plurality of storage compartments within the housing of the apparatus, and a location adjacent a cassette inlet/outlet opening of the housing. The cassette transport device can undergo translatory movement along any of three orthogonal axes.

SUMMARY OF THE INVENTION

The present invention provides, in a self-service transaction apparatus having a plurality of article-handling devices that dispense and/or receive articles of qualitatively different types, a multi-purpose robot that is capable of gripping articles of each of the different types, and that is also capable of translatory movement along transverse axes between different ones of the devices. The robot can and preferably does transport all of the articles that pass between the apparatus and a user of it during performance of a transaction, and preferably also transports other articles needed to maintain certain of the handling devices in operation.

The invention also provides an improved method of operating a self-service transaction of the type having article-handling devices that dispense and/or receive articles of different types during transactions with a person using the apparatus. The method includes the steps of providing a multi-purpose robot that is capable of gripping articles of each of the different types, and that is also capable of translatory movement along transverse axes; and utilizing the robot during performance of transactions by the apparatus to transport the different type articles between users of the apparatus and the article-handling devices. The method preferably also includes using the robot to perform maintenance services upon at least some of the handling devices of the apparatus.

DESCRIPTION OF THE DRAWINGS

Other features of the invention will be apparent from the following description of an illustrative embodiment thereof, which should be read in conjunction with the accompanying drawings in which.

DESCRIPTION OF THE PREFERRED EMBODIMENT

Figure 1:
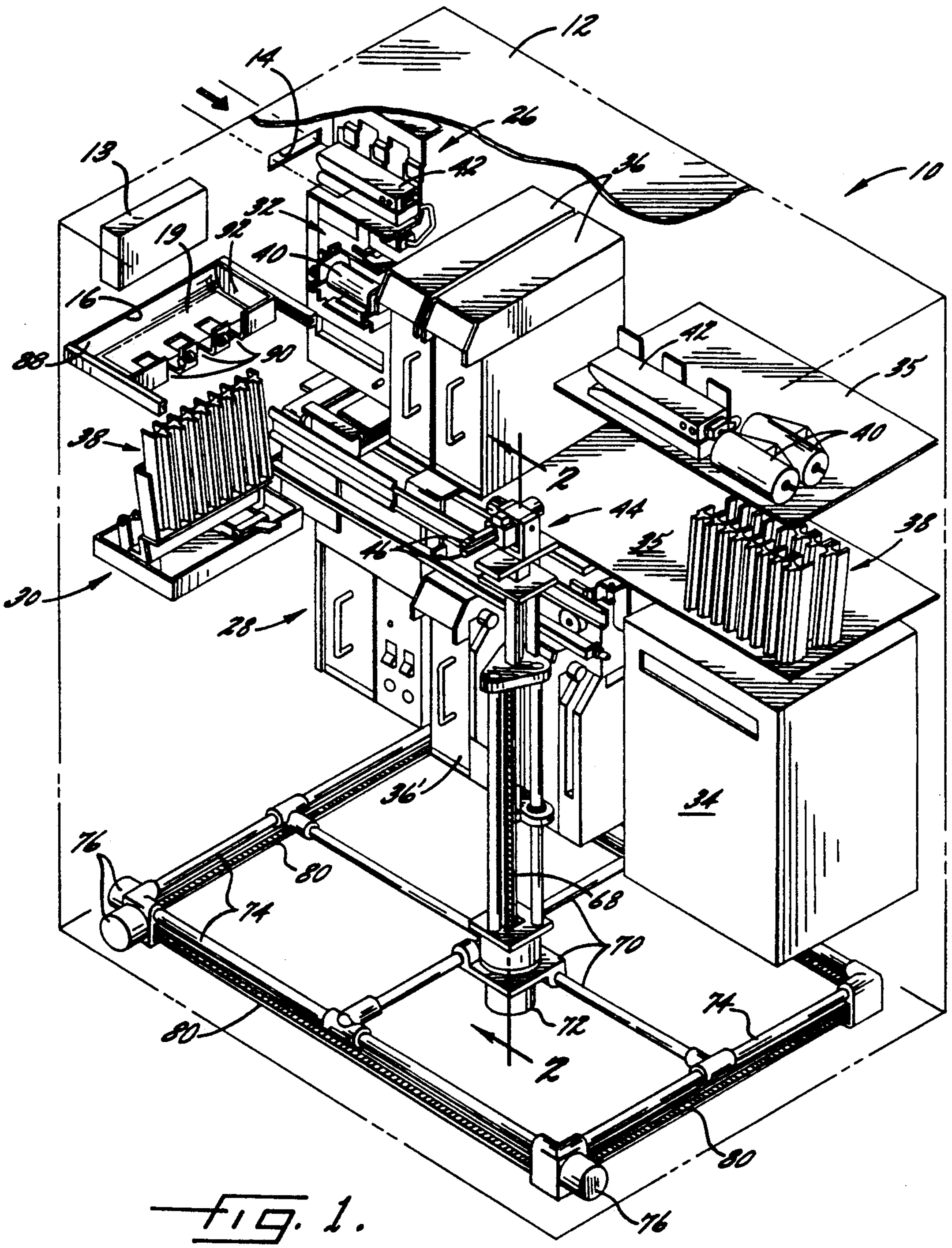
FIG. 1 is a perspective View of a self-service transaction apparatus in accordance with and suitable for practice of the invention, the housing of the apparatus being only fragmentarily shown.
Figure 6:
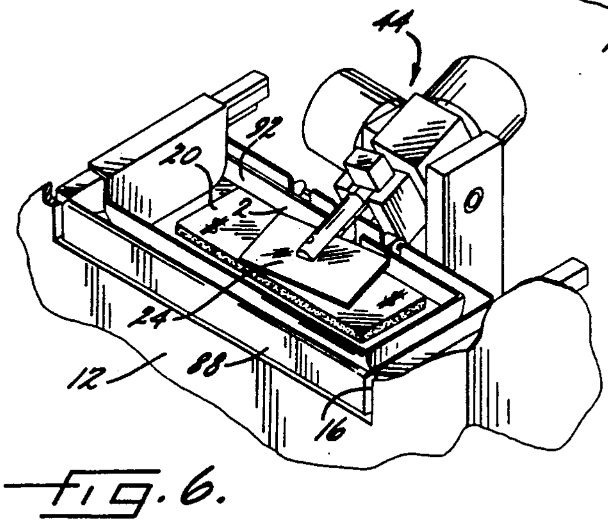
FIG. 6 is a perspective view of the robot transferring a printed statement to the drawer of the access port.
Figure 7:
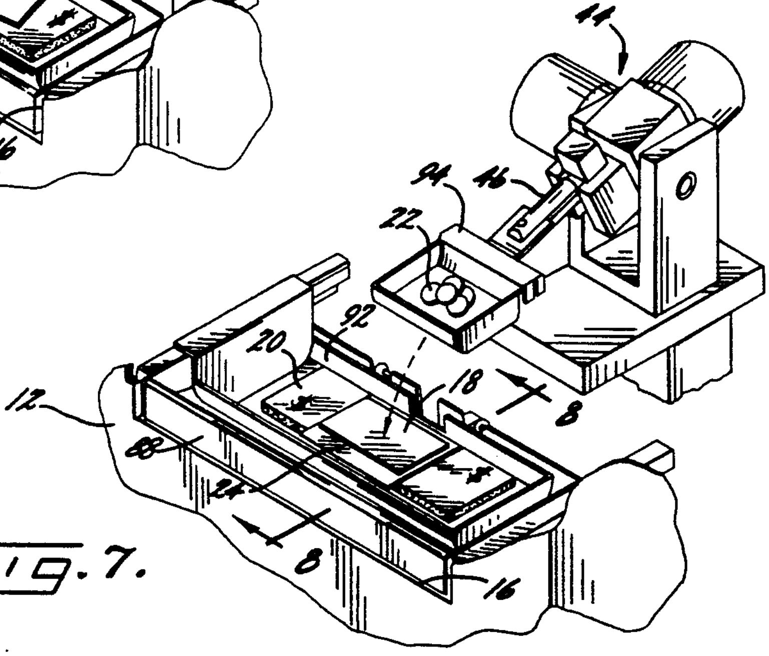
FIG. 7 is a perspective view of the robot transporting coins to the drawer of the article access port.
Figure 8:
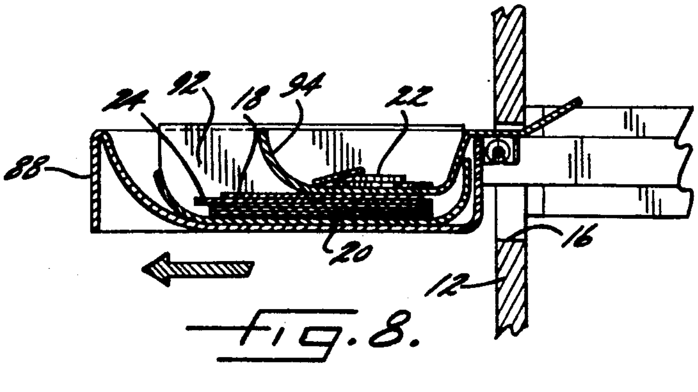
FIG. 8 is a sectional view taken substantially along the line 8—8 of FIG. 7, showing the drawer of the access port in a forwardly extended condition.

The numeral 10 in FIG. 1 designates a self-service transaction apparatus which illustratively is of the type used for performing banking transactions. Apparatus 10 includes a secure housing 12 having, on the wall thereof confronting a user of the apparatus, an interface panel 11 by which information is transmitted between the apparatus and user. Panel 11 may be of any desired type, but customarily would include a key pad and an optical display screen (not shown). The same wall of housing 12 also has article access means, illustratively including two ports 14, 16 (see also FIGS. 5-8) for at desired times during a banking transaction permitting passage therethrough of articles of the various different types normally associated with automatic banking transactions, such as a machine-readable customer identification and/or credit card 18 (FIGS. 7 and 8), a deposit envelope or check 19 (shown in phantom lines in FIG. 1), paper and metallic currency such as bills 20 and coins 22 (FIGS. 5-8), and a receipt or similar printed statement 24 (FIGS. 6-8).

Figure 4:
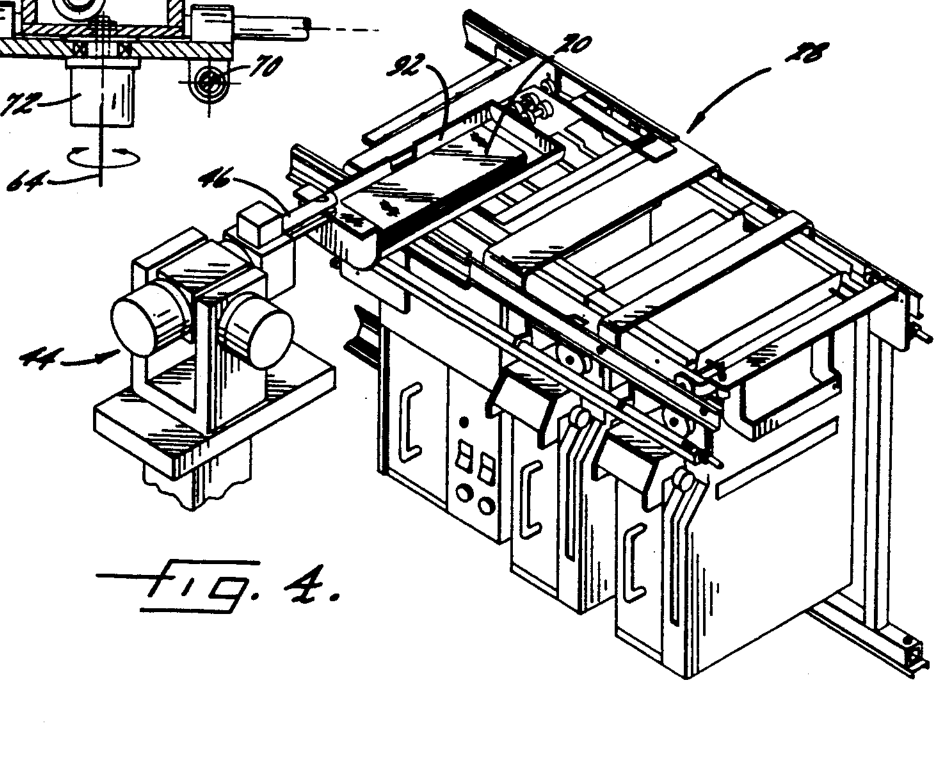
FIG. 4 is a perspective view showing the robot transporting paper currency from a dispensing device, also shown in FIG. 1, of the apparatus.
Figure 5:
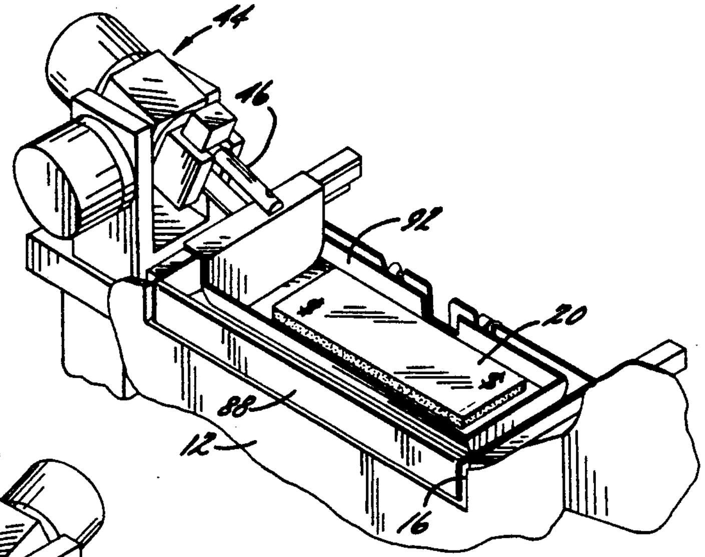
FIG. 5 is a perspective view of the robot transferring paper currency to a drawer of an article access port of the apparatus.

At any suitable location within housing 12 there are a plurality of article handling devices for receiving, supplying and/or otherwise handling the aforesaid articles. Such devices include a card reader 26 (FIGS. 1, 13 and 14) for reading the customer identification or banking cards 18, a paper currency dispenser 28 (FIGS. 1, 4 and 11) for dispensing bills 20, a metallic currency dispenser 30 (FIGS. 1 and 12) for dispensing metallic coins 22, a printer 32 (FIGS. 1, 9 and 10) for printing receipts or similar statements 24 and, if desired, for also printing identification upon deposits 19; and a repository 34 (FIG. 1) for receiving and storing deposits 19 and possibly other articles, such as stolen or expired cards 18.

Housing 12 also contains, upon any suitable storage shelves 35 or the like, maintenance articles for maintaining and/or restoring operation of various of the article handling devices. The illustrated maintenance articles include full paper currency containers 36 and metallic currency containers 38 that may be substituted for the identical containers shown in FIG. 1 in operative association with currency dispensers 28, 30, respectively; replacement rolls 40 of paper that may be substituted when needed for the paper roll in printer 32; and a replacement read head 42 that may be substituted for the read head 42' in card reader 26. The illustrated maintenance articles are merely exemplary of those that might be provided, and additional ones of the same or different types might also be stored within housing 12 if desired.

Figure 2:
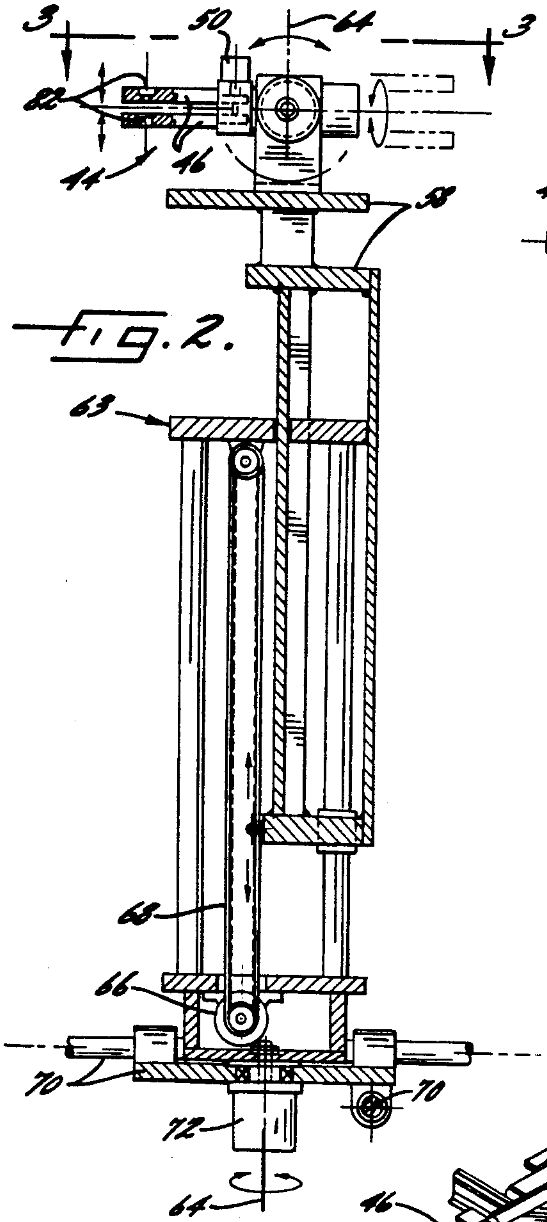
FIG. 2 is an enlarged view, partially in side elevation and partially in vertical section taken substantially along the line 2—2 of FIG. 1, of a multi-purpose article gripping and transporting robot of the apparatus, and of adjacent components of its mounting and drive means.
Figure 3:
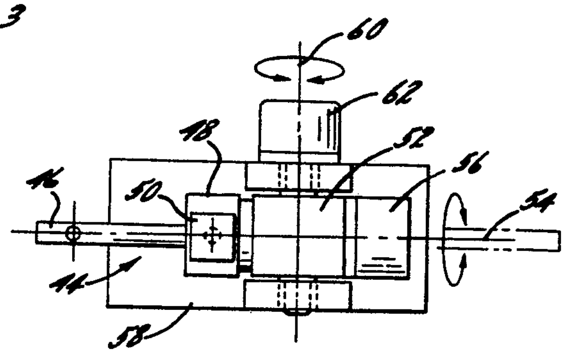
FIG. 3 is a further enlarged top plan view of the robot of FIG. 2.

A multi-purpose article gripping and transporting robot 44 is mounted within housing 12 for multi-directional movement which preferably and illustratively includes translational movement along and rotational movement about three orthogonal axes. As best shown in FIGS. 2 and 3, robot 44 consists of an article gripper having of cooperating gripper jaws 46 which are mounted by a frame 48 for movement toward and away from each other under the impetus of a drive motor 50 mounted upon the frame. Frame 48 is mounted by a frame 52 for rotative movement about an axis 54 (FIG. 3) under the impetus of a drive motor 56. Frame 52 and the components carried by it are in turn mounted by a frame 58 for rotative movement about an axis 60 (FIG. 3) under the impetus of a motor 62. Another frame 63 mounts frame 58 for translatory movement along a vertical axis 64 (FIG. 2) under the impetus of a drive motor 66 carried by frame 63 and drivably connected to frame 58 by an endless timing belt 68 driven by motor 66 and connected to frame 58. Frame 63 is mounted adjacent its lower end by a frame assembly 70 for rotative movement about vertical axis 64 under the impetus of a motor 72. A base assembly 74 (FIG. 1) mounts frame assembly 70 for translatory movement along orthogonal horizontal axes. Such movement is imparted to frame assembly 70 by drive motors 76 mounted upon base assembly 74 and drivably connected to frame assembly 74 by timing belts 80. With the possible exception of the motor 50 that opens and closes its article gripping jaws 46, all of the aforesaid drive motors of robot 44 preferably are stepper motors which permit precise control over and monitoring of the movements of robot 44.

Figure 15:
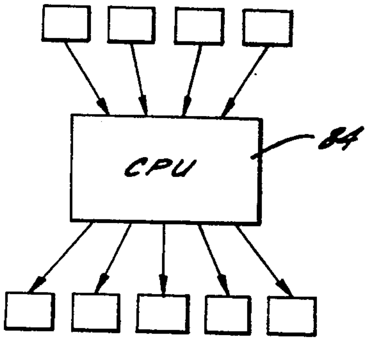
FIG. 15 is a diagrammatic representation of control means and associated components of the apparatus.

As is diagrammatically indicated in FIG. 15 of the drawings, the operation of apparatus 10 is controlled by a central processing unit (CPU) 84 that receives input data from a plurality of sources, and that transmits control outputs. The sources from which CPU 84 receives input customarily include a data bank containing customer identification and account status information; customer interface panel 13; sensors and/or monitoring devices associated with card reader 26, currency dispensers 28, 30, printer 32, repository 34; and an optical or other sensor 82 (FIG. 2) provided in association with gripper jaws 46 of robot 44 for the purpose of detecting proximity of the jaws to an article to be gripped thereby.

The components to which the control outputs of CPU 84 are directed include all of the motors that drive robot 44, in addition to the other standard components of apparatus 10 such as interface panel 13, devices 26, 28, 30, 32, etc. CPU 84 may also receive input from various position monitors (not shown) that monitor the various translational and/or rotational positions to which robot 44 is driven by the drive motors associated therewith. However, when such drive motors are of the stepper type, as is preferred, such sensors may be eliminated altogether, or at least greatly reduced in number, since the positions of robot 44 can be readily derived by the CPU from the control outputs transmitted by it to the robot drive motors.

At the outset of a banking transaction between apparatus 10 and a user of the apparatus, robot 44 customarily would be positioned by CPU 84 at a location within housing 12 such that its then open jaws 46 receive the banking card 18 inserted by the user into the slot-like port 14 of housing 12 (FIG. 1). CPU 84 causes the jaws of 82 of robot 44 to grip card 18 when its presence between the jaws is detected by the sensor 82 associated therewith. CPU 84 then causes robot 44 to transport the card into and longitudinally of the card-receiving slot within the read head 42' of card reader 26. If the data read by card reader 26 and transmitted to CPU 84 indicates that card 18 was improperly oriented when inserted by the user into the port of access means 14, CPU 84 may command robot 44 to either return the card to the user, or to re-orient the card and then again move it longitudinally of the read head slot. If the card is identified as a lost, stolen or expired one, robot 44 may be commanded by CPU 84 to either return the card to the user, or to transport it to repository 34. Assuming, however, that the card is a valid one, CPU 84 commands robot 44 to leave the card within the rear end portion of the slot of read head 42', or at some other "temporary" location, pending completion of the banking transaction requested (via interface panel 13) by the user of apparatus 10. If the transaction is simply one in which the user of apparatus 10 desires information as to an account balance, or a transfer of funds between two different types of accounts, CPU 84 causes printer 32 to print a statement of such transaction, and simultaneously causes robot 44 to move from its position adjacent card reader 26 to a position adjacent printer 32. CPU 84 then causes robot 44 to remove the printed statement from printer 32 and transport it to and into the extendable and retractable drawer 88 associated with article access port 16, which drawer has slot-like openings 90 (best shown in FIG. 1) that permit articles to be conveniently inserted into and/or removed from it by robot 44. CPU 84 then further causes robot 44 to retrieve transaction card 18 from card reader 26, or its other "parked" location, to transport the card to and into drawer 88, and to then move the drawer forwardly to its FIG. 8 extended position wherein the articles contained therein can be removed by the user of apparatus 10. After a preselected period of time sufficient for the user of apparatus 10 to have removed the articles from drawer 88, CPU 84 causes robot 44 to return drawer 84 to its retracted position, thus completing the transaction.

If the transaction is one in which the user of apparatus 10 receives currency, CPU 84 also causes a desired amount of currency to be dispensed by paper currency dispenser 28 and/or metal currency dispenser 30 into suitable trays 92, 94 (FIGS. 5–8) respectively removably associated with such dispensers, and then causes the currency in the trays to be successively transported by robot 44 to and into drawer 88 of access port 16. Releasable interlocking means upon trays 92, 94 and drawer 88 prevent removal of the trays from the drawer when the latter is in an open condition. In the case of the coin tray 94, the aforesaid interlocking means includes pin elements 98 (FIG. 8) that permit upward pivotal movement of the tray, for the purpose of allowing a user access to the paper currency and/or other articles disposed below tray 94, while still prohibiting removal of the tray from the open drawer 88.

When the user-requested banking transaction consists of or includes a deposit, CPU 84 causes robot 44 to extend drawer 88 so that a deposit envelope 79 (FIG. 1) can be placed into the drawer by the user of the apparatus. CPU 84 then causes robot 44 to retract drawer 88, remove deposit envelope 79 from the drawer, and then transport such envelope to repository 34 either directly or via printer 32, which printer is preferably of a type capable of not only printing receipts and other statements, but also of placing identifying indicia upon deposit envelopes 19, checks and the like. In the case of a multiple-part transaction, such as one involving both a cash withdrawal and a deposit, the statement(s) printed by printer 32 and transported by robot 44 to drawer 88 of course reflect all parts of the transaction.

While apparatus 10 illustratively includes two access ports 14, 16 for passage of articles between the interior and exterior of house 12, the number of access ports can be further reduced if desired. Thus, the access port 14 through which cards 18 are introduced into the housing can be eliminated and, in lieu thereof, drawer 88 and robot 44 can be utilized to introduce each user card into housing 12. This would make the transactions conducted by apparatus 10 even more similar to those performed between a customer and a human bank teller through a single teller-cage opening. In any event, however, the number of article access openings in the housing 12 of the present apparatus 10 is significantly less than in other self-service apparatuses used for banking purposes. This, in conjunction with the fact that all articles dispensed from apparatus 10 to a user may and preferably do pass as a group through a single access port, specifically the port 16 containing drawer 88, contributes significantly to the ease and "familiarity" of operation.

Figure 9:
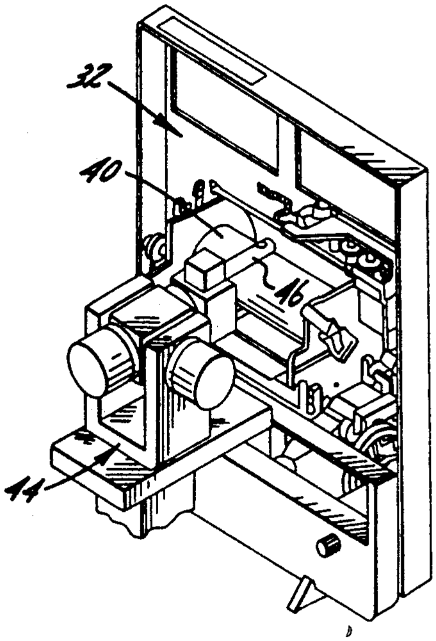
FIGS. 9 and 10 are perspective views showing the robot servicing a printing device of the apparatus.
Figure 10:
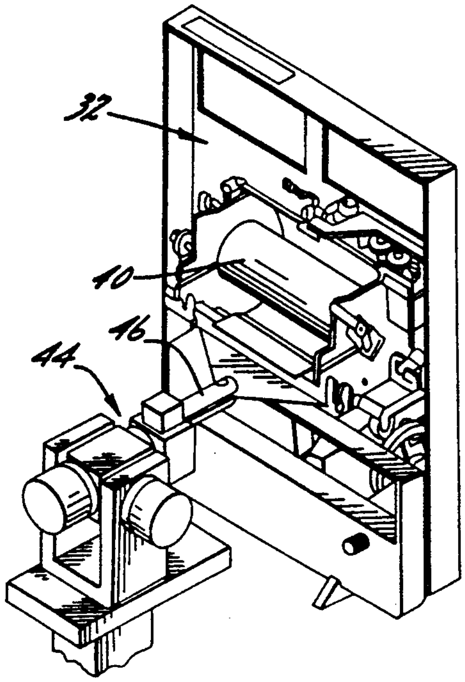
Figure 11:
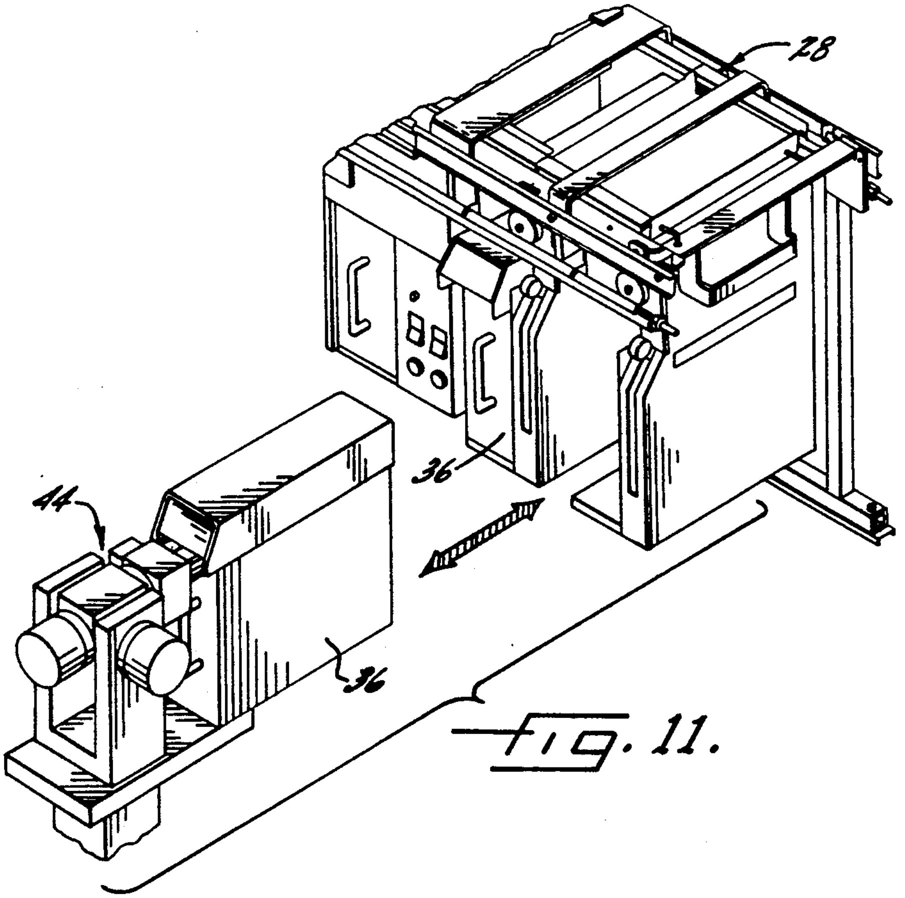
FIG. 11 is a perspective view showing the robot servicing a paper currency dispensing device, also shown in FIGS. 1 and 4 of the apparatus.
Figure 12:
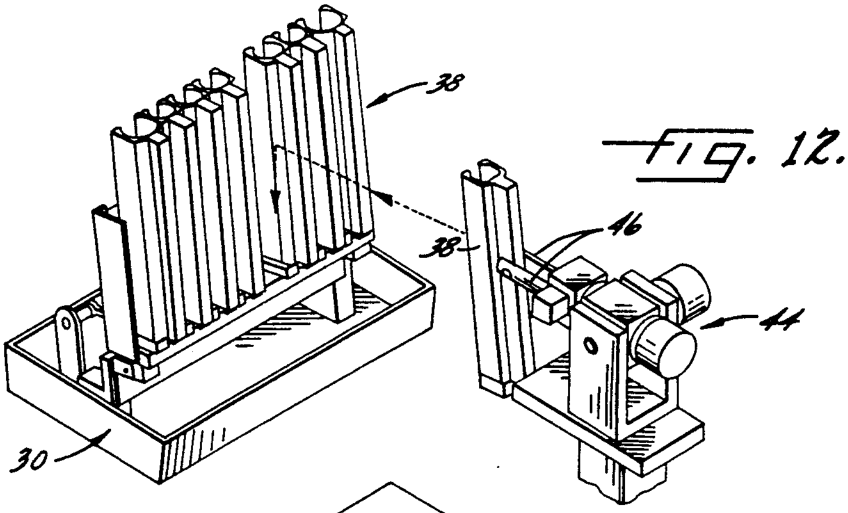
FIG. 12 is a perspective view showing the robot servicing a metal currency dispensing device, also shown in FIG. 1, of the apparatus.
Figure 13:
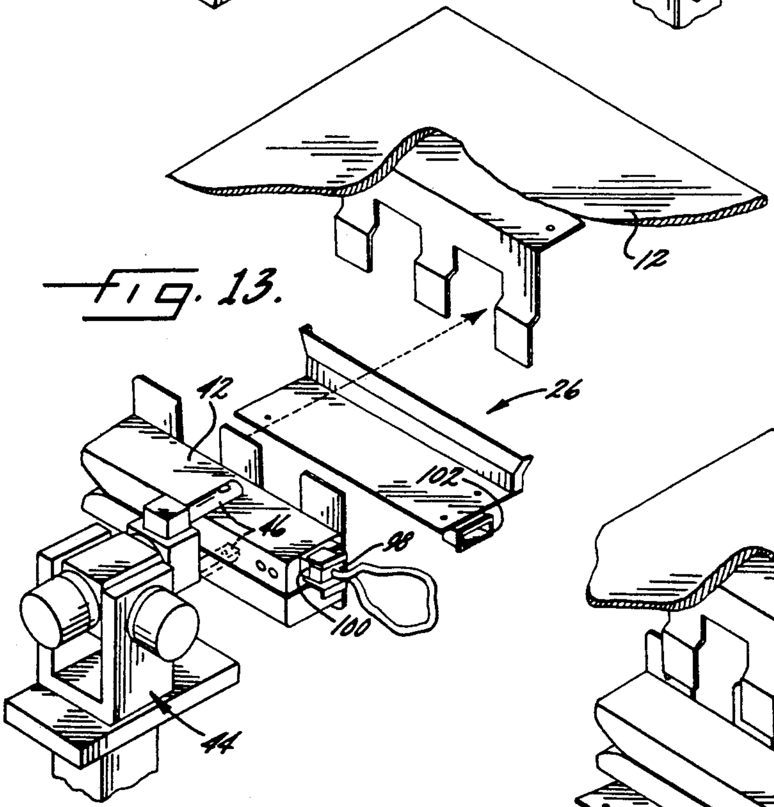
FIGS. 13 and 14 are perspective views showing the robot servicing a card reader, also shown in FIG. 1, of the apparatus.
Figure 14:
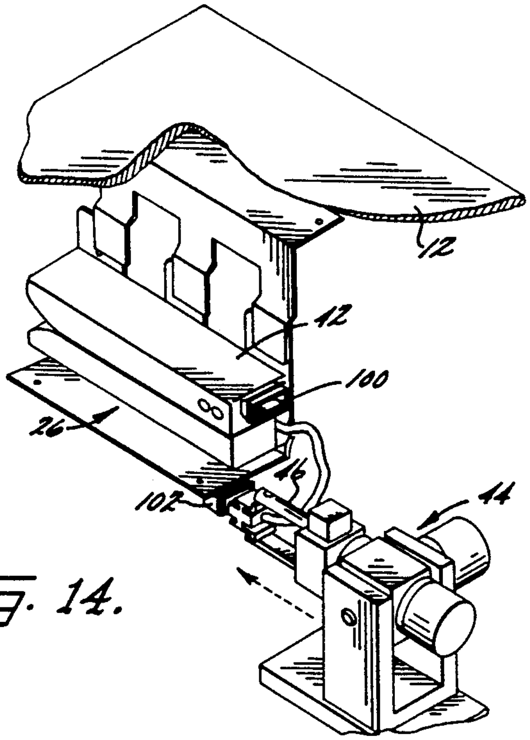

Since multi-purpose article gripping and transporting robot 44 is movable freely throughout substantially all of housing 12, and is capable of gripping and transporting articles of markedly differing kinds, sizes and/or shapes, robot 44 may be and preferably is also used to perform maintenance services upon various of the article handling devices within housing 12. Thus, robot 44 may be used to replace and "thread up" the paper rolls 40 of printer device 32, as indicated in FIGS. 9 and 10 of the drawings; to replace a currency container 36 of paper currency dispenser 28, as indicated in FIG. 11; to replace a coin container 38 of coin dispenser 30, as shown in FIG. 12; and/or to insert a replacement read head 42 into card reader 26, as indicated in FIGS. 13 and 14. As is indicated in FIG. 14, the last-mentioned maintenance operation illustratively includes not only transporting the replacement read head 42 to its proper position in card reader device 26, but also unplugging an electrical plug 98 from a dummy socket 100 upon the replacement head, and thereafter inserting the plug into an active socket 102 upon the base of the card reader. CPU 84 may be programmed so as to cause robot 84 to render the foregoing and/or other maintenance services on an "as-needed" or "demand" basis. Preferably, however, CPU 84 causes at least some of the maintenance services to be rendered on a periodic basis at times when apparatus 10 is not performing a banking transaction.

Figure 16:
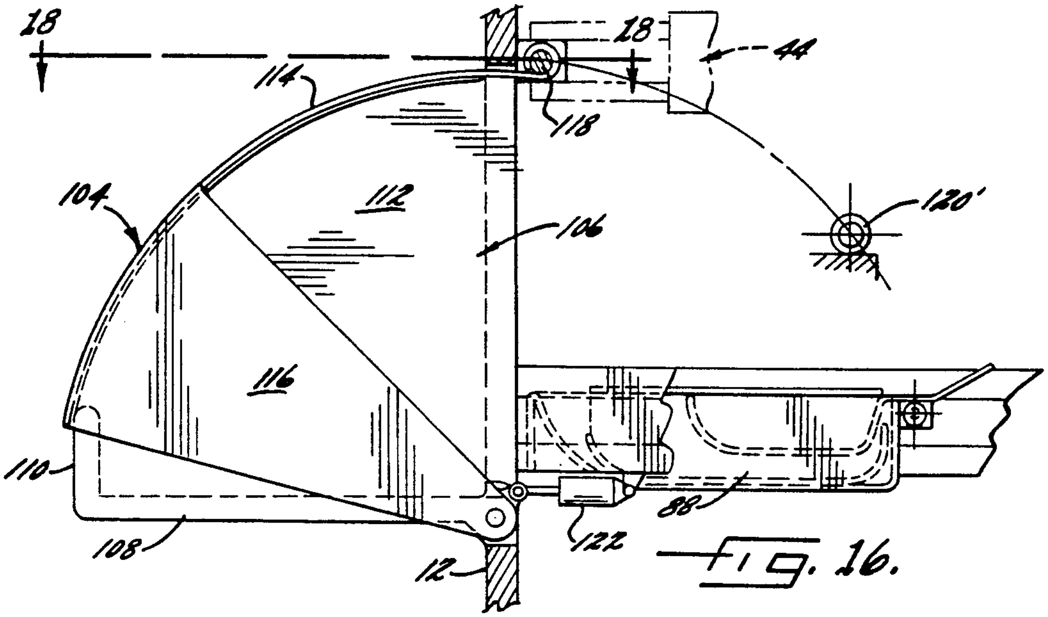
FIG. 16 is a partially sectional and partially elevational view of another embodiment wherein a pivotally movable shroud and associated protective components are associated with the article access port through which a transaction drawer passes.
Figure 17:
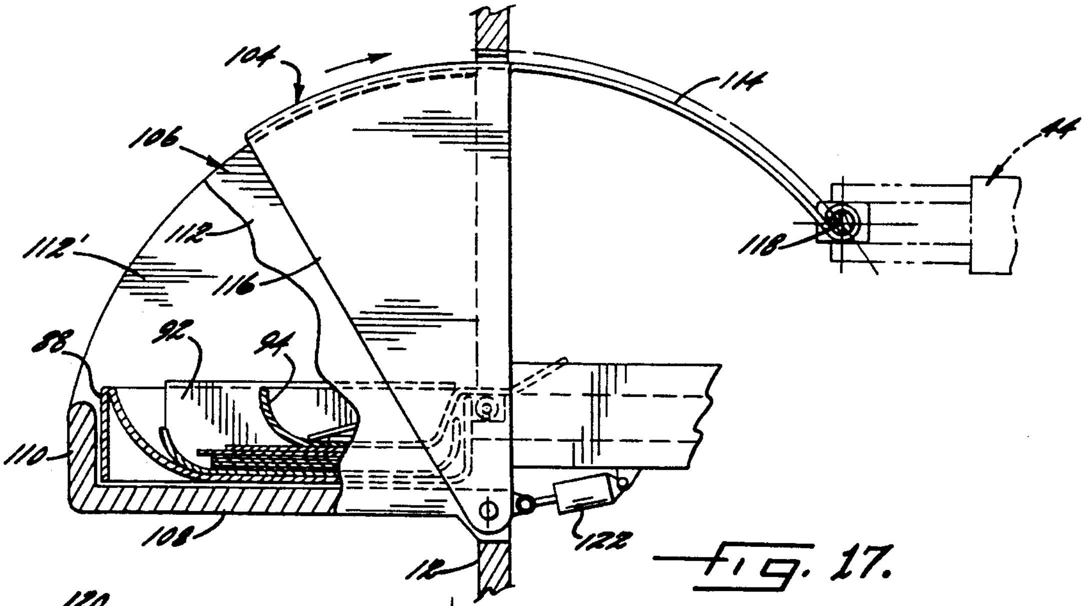
FIG. 17 is a view similar to FIG. 16 but showing the movable components in different positions.
Figure 18:
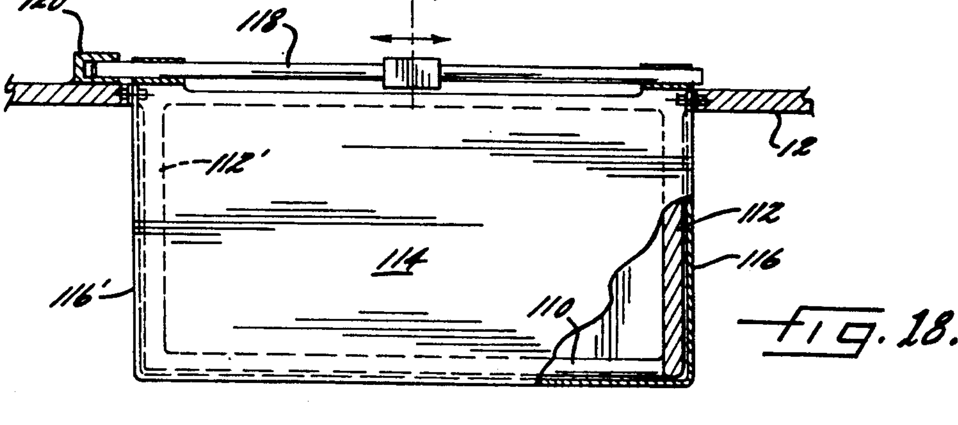
FIG. 18 is a top plan view with some components being shown in section taken approximately along the line 18—18 of FIG. 16.

FIGS. 16–18 show another embodiment wherein additional protective means is provided in association with access port 16 and transaction drawer 88 for the purpose of further shielding them from ambient weather conditions, vandalism and the like. The protective means includes a shroud member 104, and a tray member 106 with a bottom wall 108, a front wall 110, and upwardly extending side walls 112, 112' having arcuate forward edges. Tray 106 is mounted upon and projects outwardly from enclosure 12 at a location such that it receives transaction drawer 88 when the drawer is moved from its retracted position (FIG. 16) to its extended position (FIG. 17). Shroud 104 includes an arcuate central section 114, opposite side sections 116, 116', and an elongate control rod 118 mounted upon the rear part of central section 114 for limited axial movement. The shroud side sections 116, 116' closely overlie the outer major surfaces of respective ones of tray side walls 112, 112', and shroud central section 114 closely overlies the arcuate forward edges of such walls. Suitable bearings and shafts connected to the lower ends of shroud side sections 116, 116' and to enclosure 12 mount shroud 104 for pivotal movement between extended and retracted positions. When shroud 104 occupies its extended position shown in FIG. 16, the shroud and tray 106 render transaction drawer 88 inaccessible to weather conditions and to persons. When shroud 104 occupies its retracted position and drawer 88 occupies its extended position, as shown in FIG. 17. the shroud still partially shields the drawer from ambient weather conditions but then permits access to the drawer by a person using apparatus 10. Shroud 104 may be temporarily locked in its extended position (FIGS. 17 and 18) by axial movement in the appropriate direction (to the left, as viewed in FIG. 18) of its control rod 118 into the then therewith aligned bore of a locking member 120 affixed in any suitable manner to the frame of enclosure 12. A similar locking member 120' (FIG. 16) permits shroud 104 to be temporarily locked in its FIG. 17 retracted position. Pivotal movement of shroud 104 between its extended and retracted positions, and axial movement of its control rod 118 into and out of locking members 120, 120', are produced by robot 44, which at appropriate times during the transaction is caused by CPU 84 (FIG. 15) to grip an enlarged central section of rod 18 and then sequentially move the rod in the directions necessary to produce the desired axial and/or transverse movements of the rod. During the final stages of a currency withdrawal transaction, for example, robot 44 might and likely would firstly advance the currency-containing drawer 88 from its FIG. 16 retracted position to its FIG. 17 extended position; then retract rod 118 from locking member 120; then move shroud 104 from its FIG. 16 extended position to its FIG. 17 retracted position; and then move rod 118 into the retracted position locking member 120'. After a period of time sufficient for a user of apparatus 10 to have removed the currency from drawer 88, robot 44 retracts rod 118 from locking member 120', pivots shroud 104 forwardly and, after the shroud reaches its FIG. 16 extended position, again inserts rod 118 into locking member 120. For greater safety of operation, the latter part of the pivotal movement of shroud 104 to its FIG. 16 extended position may be and preferably is accomplished by gravity and a passive fluid-operated closure device 122 (FIGS. 16 and 17), rather than by robot 44. Device 122 prevents overly abrupt and/or forceful final movement of shroud 104 which, if allowed to occur, might injure the user of apparatus 10.

While specific embodiments of a particular self-service transaction apparatus and method have been shown and described, this was for purposes of illustration only, and not for purposes of limitation, the scope of the invention being in accordance with the following claims.

We claim:

1. A self-service apparatus for conducting banking transactions, comprising:

a housing having restricted access port means for permitting passage of articles into and from said housing;

a dispenser of currency within said housing;

a dispenser of printed statements within said housing;

a repository for deposits within said housing;

a multi-purpose robot having an article gripper movable in translation along orthogonal X, Y and Z axes to and between different locations within said housing, said article gripper transporting currency from said dispenser of currency to said port means, and transporting printed statements from said dispenser of printed statements to said port means, and transporting deposits from said port means to said repository;

said article gripper of said robot including a pair of cooperating gripper jaws, first frame means mounting said gripper jaws for movement toward and away from each other, first drive means upon said frame means for imparting said movement to said gripper jaws, second frame means mounting said first frame means for rotative movement about an axis generally parallel to said gripper jaws, drive means for imparting said movement to said second frame means, third frame means mounting said second frame means for rotative movement about a second axis perpendicular to said first-mentioned axis, drive means for imparting movement about said second axis to said second frame means, fourth frame means mounting said third frame means for substantially vertical translatory movement, drive means carried by said fourth frame means for imparting said substantially vertical movement to said third frame means, fifth frame means mounting said fourth frame means for rotative movement about a substantially vertical axis, drive means for imparting said rotative movement about said substantially vertical axis to said fourth frame means, a base assembly mounting said fifth frame means for translatory movement along orthogonal substantially horizontal axes, drive means carried by said base assembly for imparting said movement to said fifth frame means.

* * * * *